United States Patent [19]

Imataki et al.

[11] 4,285,575
[45] Aug. 25, 1981

[54] IMAGE DISPLAY DEVICE

[75] Inventors: Hiroyuki Imataki, Kawasaki; Michiko Takahashi, Tokyo; Masatsune Kobayashi; Tokuya Ohta, both of Yokohama, all of Japan

[73] Assignee: Canon Kabushiki Kaisha, Tokyo, Japan

[21] Appl. No.: 10,971

[22] Filed: Feb. 9, 1979

[30] Foreign Application Priority Data

Feb. 15, 1978 [JP] Japan ................................ 53-16763

[51] Int. Cl.³ .............................................. G02F 1/17
[52] U.S. Cl. ................................... 350/357; 252/408; 252/500
[58] Field of Search ................ 252/408, 500; 350/357

[56] References Cited

U.S. PATENT DOCUMENTS

| 3,451,741 | 6/1969 | Manos | 350/357 |
|---|---|---|---|
| 3,712,709 | 1/1973 | Kenworthy | 350/357 |
| 3,774,988 | 11/1973 | Rogers | 350/357 |
| 3,806,229 | 4/1974 | Schoot et al. | 350/357 |
| 3,930,717 | 1/1976 | McDermott et al. | 350/357 |
| 3,963,314 | 6/1976 | Yamashita | 350/357 |
| 4,018,508 | 4/1977 | McDermott et al. | 350/357 |
| 4,059,341 | 11/1977 | Zeller | 350/357 |
| 4,073,570 | 2/1978 | Korinek | 350/357 |
| 4,116,535 | 9/1978 | Ponjee et al. | 350/357 |
| 4,117,659 | 10/1978 | Takeshita et al. | 350/357 |
| 4,212,518 | 7/1980 | Imataki et al. | 252/408 |

FOREIGN PATENT DOCUMENTS 2814824 10/1978 Fed. Rep. of Germany ........... 252/408
2839223  3/1979 Fed. Rep. of Germany ........... 252/408

OTHER PUBLICATIONS

Hackh's Chemical Dictionary, 4th Ed., McGraw-Hill Book Co., N.Y., p. 171 (1969).

Primary Examiner—Teddy S. Gron
Attorney, Agent, or Firm—Fitzpatrick, Cella, Harper & Scinto

[57] ABSTRACT

An image display device comprises a cell container, at least a pair of electrodes, an electrically responsive electrochromic medium accommodated in said cell container, said electrochromic medium comprising a complexon, $Fe^{2+}$ ion and at least one metal ion other than $Fe^{2+}$ ion.

13 Claims, 6 Drawing Figures

IMAGE DISPLAY DEVICE

BACKGROUND OF THE INVENTION

1. Field of the Invention

This invention relates to an image display device which utilizes the electrochemical color forming and bleaching phenomenon. More particularly, it is concerned with an image display device which utilizes an improved electrically responsive color forming and bleaching medium to prolong its durability against repetitive uses.

2. Description of the Prior Art

The term "electrochemical color forming and bleaching phenomenon" is meant by a reversible color forming and bleaching phenomenon dependent on the electric polarity, in which, generally speaking, a certain element forms color depending on its electric conduction, and bleaches the color (i.e., reinstatement to the original color by its electric conduction in an opposite polarity to that for the color forming, or by heat application, or by a combination of these treatments. This is usually called "electrochromic phenomenon".

Mechanism for causing the electrochromic phenomenon is not always simple, although, in most cases, it is considered due to the so-called oxidation-reduction reactions between an electrolyte and a color forming substance. In this case, there can be made no clear distinction between the electrolyte and the color forming substance in their material aspect, i.e., one and the same substance may, in some cases, be the color forming substance as well as the electrolyte. From another standpoint, this electrochromic phenomenon is understood to take place by variations in the light absorbing characteristic of such substance due to injection of electrons into the center of color element. In reality, however, such phenomenon is considered to occur as the result of combination of the oxidation-reduction reactions and the electron injection.

Since the electrochromic phenomenon is to cause color which a material possesses primarily to change electrically, the color combination is of wide varieties. Also, whether the substance can permit light to pass therethrough, or reflect or scatter it is not determined by the property of the substance per se, but by a method of forming a layer of such substance. Therefore, in the case of using such substance as the display element, it should have such a property that it may be formed either in the light transmission type or in the light reflection type.

Among various kinds of such electrochromic phenomenon, a phenomenon based on the electrolysis of the substance due to electric current, i.e., oxidation and reduction reactions of the substance (redox reaction) is especially called "electrochemichromism", the study of which is now in fashion in the field of image display technology.

In general, for the display device, the technology of which is based on the electrochemichromism, there has been known to use a cell which accommodates therein a working electrode and a counter electrode having a light transmitting or reflecting property, and an electrochromic material (an electrically responsive chromic substance consisting of an electrochemical color forming and bleaching substance), an electrolyte, and a solvent capable of dissolving these substances. This electrochromic material reversibly changes its oxidation and reduction conditions by passage therethrough of electric current to be able to bring about a detectable change on the outer appearance of the working electrode, i.e., the reduction in the substance causes the color forming, while the oxidation therein causes the color bleaching, or vice versa. These two electrodes and the electrolytic solution are accommodated in an appropriate housing having means, through which the working electrode can be seen. The electrochromic material in such image display device is capable of accepting or donating electrons, by which it usually turns into a radical ion having a high degree of light absorption in the visible range of the spectrum, and, at the same time, this radical ion combines with an anion existing in the medium to form on the working electrode a color forming body insoluble in the medium.

The above-described cell for the image display device is driven in three stages, i.e., (1) a write-in operation to the working electrode, which takes place when a direct current voltage is applied thereto from outside so that the working electrode may be in the negative polarity and the counter electrode in the positive polarity; (2) a memory operation which takes place when the external voltage application is interrupted and the circuit is opened (the write-in operation on the working electrode being continued); and (3) an erasing operation of the contents written in on the working electrode by application of a direct current voltage from outside in a manner to render the working electrode to assume the positive polarity, and the counter electrode the negative polarity. Incidentally, it is also possible to effect the write-in operation with the working electrode being in the positive polarity.

U.S. Pat. No. 3,712,709 describes the image display device of the above-described type, in which the electrochromic medium consisting of N,N'-di(p-cyanophenyl)-4,4'-bipyridinium salt, potassium chloride, sodium ferrocyanide, diluted sulfuric acid, etc., is used.

U.S. Pat. No. 3,806,229 described an image display apparatus, wherein an electrochromic medium consisting of salts of dipyridinium compounds, and an adjuvant such as substituted hydroquinones having a standard oxidation-reduction potentials of 0.7 V and above, ferrous salts, or 1,4-di(dialkylamino)benzenes, etc. is held between opposing electrodes.

Further, U.S. Pat. No. 3,930,717 discloses a similar type of image display device.

In either of the abovementioned image display devices as taught in the prior patents, however, there has been pointed out that repetitive durability of the image display element, i.e., its lifetime, constitutes a problem. In more detail, such phenomena as insufficiency in color forming, insufficiency in color bleaching, occurrence of side-reaction in the color forming, occurrence of irregularity in the formed color, changes in color tone, etc. remarkably curtail the lifetime of the image display element. In particular, when a rapid impression of voltage is effected in each of the write-in and the erasing steps within a short time such as less than one second, the above-mentioned phenomena become remarkable. Further in particular, when an oxide electrode such as $In_2O_3$, $SnO_2$ and the like is used, side reactions occur on the surface of the electrode and life of the display device is remarkably shortened.

The main cause for such shortened service life of the element is presumed to be electrode contamination. The contamination is said to be caused by various factors such as impurities contained in the electrochromic medium, products from chemical changes in such electrochromic medium, impurities discharged from the cell container, inadequacy in the driving system, and others, all these factors being combined sophisticatedly.

To improve such disadvantages, there have been proposed improved techniques concerning new adjuvants or auxiliary agents to be added to the electrochromic material or the electrochromic medium.

For example, U.S. Pat. No. 4,018,508 discloses an image display device which provides the most highly improved service life. In this image display device, there is used the electrochromic medium consisting of N-(p-cyanophenyl) substituted derivatives which are bicyclic compounds having two nitrogen containing rings, an auxiliary redox system in the form of $Fe^{++} \rightleftarrows Fe^{+++}$, and a carboxylic acid complexing agent. The auxiliary redox system is used for reversibly effecting the electrochemical oxidation-reduction reactions of the electrochromic material (N-(p-cyanophenyl) substituted derivatives) with good balance, while the carboxylic acid complexing agents is used for preventing $Fe^{+++}$ ion resulted from the reaction in the auxiliary redox system from causing sedimentation of an insoluble $Fe(OH)_3$. The patent specification describes that, for the carboxylic acid complexing agent, saturated mono-oxycarboxylic acid and dioxycarboxylic acid, particularly, $\alpha$- and $\beta$-OH carboxylic acids are preferred. As the concrete examples, there are enumerated in the patent specification: formic acid, acetic acid, citric acid, tartaric acid, succinic acid, malic acid, malonic acid, cyclopropane-1,2-dicarboxylic acid, and cyclopropane-1-OH,2-carboxylic acid.

Furthermore, this patented device controls the pH value of the electrochromic medium to the side of a relatively strong acidity (i.e., pH=1 to 6, or preferably pH=1 to 4, or more preferably pH=2 to 3) with a view to stabilizing the reaction of the auxiliary redox system ($Fe^{++} \rightleftarrows Fe^{+++}$).

Even in such improved image display device as described in the foregoing, however, there still remain difficult problems which prevent the device from being put into practical use. Such difficult problems are, for example: that reversibility in the oxidation-reduction reactions of the electrochromic material cannot be satisfactorily established, even when the auxiliary redox system performing the reaction of $Fe^{++} \rightleftarrows Fe^{+++}$ is used, hence insufficiency in the color forming and color bleaching, the side reaction in the color forming, and so forth tend to occur; that sedimentation of $Fe(OH)_3$ cannot be prevented, even if the carboxylic acid complexing agent is used, hence irregularity in the formed color would take place on the surface of the electrodes; that deterioration in the electrode material is apt to take place when the pH value of the electrochromic medium is brought to the acid side (this tendency is particularly remarkable when an oxide electrode such as $SnO_2$, $In_2O_3$, etc. is used); and various other problems. On account of such various problems still to be solved, the situation as at present is that few image display device having satisfactory repetitive durability has yet been realized.

In view of the above mentioned situation, the present inventors have proposed a process for improving repeating durability of an image display devices comprising adding a complexon to an electrochromic medium containing an organic electrochromic compound as disclosed in U.S. Patent Application Ser. No. 890,966 filed on Mar. 28, 1978, now U.S. Pat. No. 4,212,518.

SUMMARY OF THE INVENTION

An object of the present invention is to provide improvement in an image display device as disclosed in U.S. Patent Application Ser. No. 890,966 to enhance the repeating durability.

Another object of the present invention is to provide the image display device which does not bring about insufficiency in the color forming or color bleaching, even when the number of times of the image display becomes increased.

A further object of the present invention is to provide the image display device which does not bring about sidereaction, even when the number of times of the image display becomes increased.

Still another object of the present invention is to provide the image display device which does not bring about irregularity in the formed color, even when the number of times of the image display becomes increased.

A still further object of the present invention is to provide the image display device which brings about little deterioration of electrodes regardless of the type of electrode material, even when the number of times of the image display becomes increased.

Still another object of the present invention is to provide the image display device which brings about little insufficiency in color forming or bleaching and little side reactions even when a rapid impression of voltage is applied within a short period of time.

A still further object of the present invention is to provide the image display which does not bring about deterioration of repeating durability even when a rapid impression of voltage is applied within a short period of time.

The present invention provides the image display device for achieving the above-mentioned objects, more particularly, an improved electrochromic medium for use in such device.

According to the present invention, there is provided an image display device which comprises a cell container, at least a pair of electrodes, an electrically responsive electrochromic medium accommodated in said cell container, said electrochromic medium comprising a complexon, $Fe^{2+}$ ion and at least one metal ion other than $Fe^{2+}$ ion.

The foregoing objects, other objects, and specific details of the device construction as well as the component for use in such electrochromic medium will become more apparent from the following detailed description of the preferred examples thereof, when read in connection with the accompanying drawing.

DESCRIPTION OF THE PREFERRED EMBODIMENTS

Figure 1:
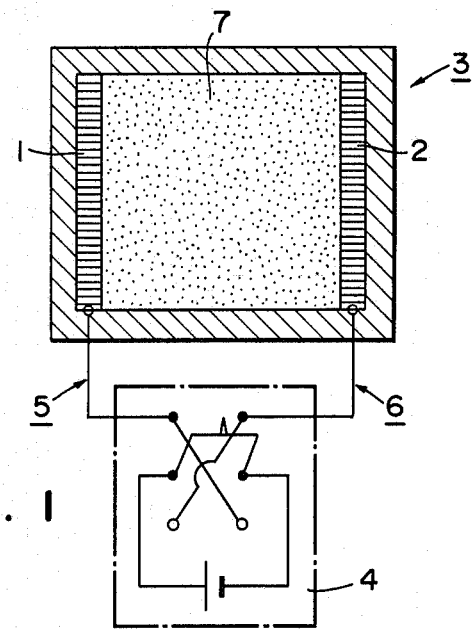
FIG. 1 is a schematic diagram showing the basic construction of the image dispaly device according to the present invention.

The basic structure of the image display device according to the present invention is as shown in FIG. 1, in which a working electrode 1 and a counter electrode 2 are disposed in a cell 3 made of glass, etc., and both electrodes are connected to a power source 4 by lead lines 5 and 6. An electrically responsive electrochromic medium 7 is sealed in the cell 3.

As the electrode material, there may be mentioned a metal such as platinum, palladium-gold and the like and a metal oxide such as tix oxide, indium oxide and the like known as a transparent electrode. From the viewpoint of chemical stability, a metal electrode is desirable, but it is not always desirable from the viewpoint of appearance since the electrode is not transparent and comes in sight. On the contrary, a metal oxide electrode which is transparent is free from such drawback. Layout of the electrodes may be either on the same plane, or mutually opposed on different planes in the cell container. The electrode is basically composed of a pair of working and counter electrodes. A separate reference electrode may be used together depending on an operating system of the image display device. It should be noted that selection of the electrode material, layout of the electrodes within the cell container, construction of the electrodes, and so on may be arbitrarily chosen in accordance with specification of the device.

Figure 2A:
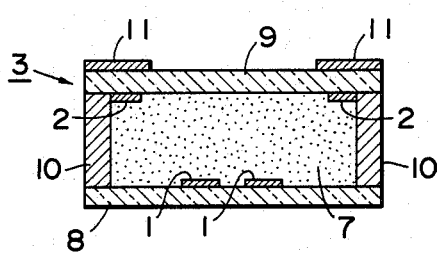
FIGS. 2A, 2B, 2C and 2D are respectively schematic diagrams in cross-section showing typical layout of the electrodes for the image display device according to the present invention.
Figure 2B:
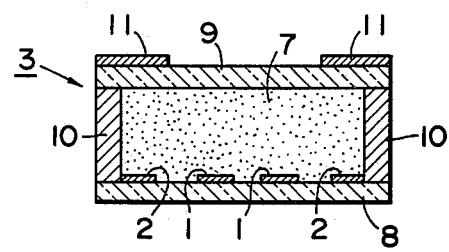
Figure 2C:
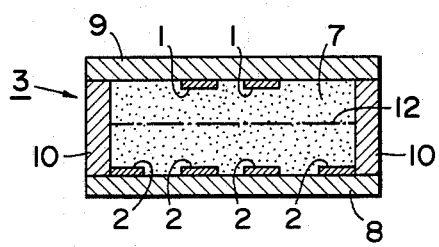
Figure 2D:
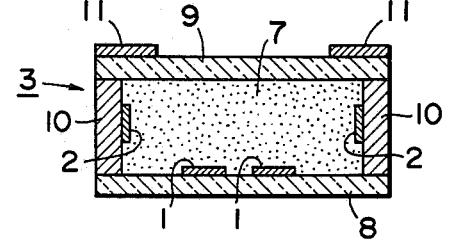

Illustrating some actual layouts of the electrode, FIG. 2A shows the cell 3, in which the working electrodes 1 are placed on a transparent or nontransparent base plate 8, the counter electrodes 2 are placed on the lower surface of a transparent base plate 9 which is opposed to the base plate 8 through a spacer 10, and the thus arranged counter electrodes 2 are concealed by appropriate masking plates 11 placed on the upper surface of the base plate 9. FIG. 2B indicates that both working electrodes 1 and the counter electrodes 2 are disposed on the one and same base plate 8, either transparent or nontransparent. FIG. 2C shows the cell 3, in which the counter electrodes 2 are placed on the transparent or nontransparent base plate 8, the working electrodes 1 are placed on the lower surface of the transparent base plate 9 which is opposed to the base plate 8 through the spacer 10, and the counter electrodes 2 are concealed by a nontransparent film 12 having an ion transmitting property. FIG. 2D shows the cell 3, in which the working electrodes 1 are placed on the transparent or nontransparent base plate 8, and the counter electrodes 2 are fixed on the upright spacer 10.

It should be noted that, besides the abovementioned electrode layouts, various other layouts may be appropriately chosen for the purpose of the present invention.

Electrochromic Medium

The electrochromic medium (i.e., an electrically responsive color forming and bleaching medium) used in the present invention comprises an electrochromic material which can also be regarded as a substance having a redox reactivity, $Fe^{2+}$ ion and at least one metal ion after $Fe^{2+}$ ion (hereinafter referred to as "second metal ion").

These components are usually used by dissolving them in an inert solvent such as water, organic solvents, mixtures of water and an organic solvent and the like.

There is no particular limitation to the kind of the electrochromic material used in the present invention, and a very wide variety of organic or inorganic substances having a redox reactivity may be exemplified.

Examples of organic electrochromic materials are:
1,1'-dimethyl-4,4'-bipyridinium dibromide,
1,1'-diethyl-4,4'-bipyridinium dibromide,
1,1'-dihepthyl-4,4'-bipyridinium dibromide,
1,1'-dibenzyl-4,4'-bipyridinium dibromide,
N,N'-di(p-cyanophenyl)-4,4'-bipyridinium dichloride,
2,2'-(diethyl)bipyridinium dichloride,
N,N'-diethyl-2,7-diazapyrenium dichloride,
N-benzyl-4-cyano-pyridinium bromide, and the like.

As the redox indicator, there may be mentioned: Safranine T, Neutral Red, Indigo monosulphanic acid, diphenylamine, diphenylamine-p-sulphonic acid, p-nitrodiphenylamine, diphenylamine-2,3'-dicarboxylic acid, diphenylamine-2,2'-dicarboxylic acid, and the like.

Among them, compounds having a structure of a quaternary ammonium salt are preferable, and compounds having a bipyridinium structure are more preferable.

The above mentioned electrochromic materials are usually used in a form of a solution in an inert solvent. Such solvent is usually water, but there may be also used non-aqueous solvent such as methyl alcohol, ethyl alcohol, ethylene glycol, propylene carbonate, benzene, chloroform, acetonitrile, nitrobenzene, ethyleneglycol monomethyl ether acetate, carbon tetrachloride, formic acid, pyridine, tetrahydrofuran, dioxane, dimethyl formamide, dimethyl sulfoxide and the like, and mixtures of water and such non-aqueous solvent.

A complexon used in the present invention is a general term for compounds capable of forming a chelate with a metal ion and, from a chemical structural point of view, it is an aminopolycarboxylic acid derivative or its structural homologue.

For example, the aminopolycarboxylic acid derivative is a complexing agent having, in the molecule, at least one structure,

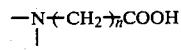

where n is 1 or 2 and hydrogen atom of $CH_2$ adjacent to nitrogen atom may be replaced by methyl or phenyl.

This type of compound contains a diamine derivative having two nitrogen atoms to which an acid group [—(CH₂)ₙCOOH], where n is 1 or 2, capable of coordination directly attaches.

The structural homologue of an aminopolycarboxylic acid is a compound having a structure similar to the above mentioned structure, —N—(CH₂)ₙCOOH, where n is 1 or 2.

In general, this compound has a structure, >A—(CH₂)ₙB where n is 1 or 2, A is an element of Group V of the Periodic Table such as N, P, As and the like, and B is —COOH (when A is not nitrogen),

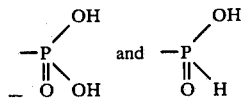

The structural homologue can form a stable chelate with a metal ion by a non-covalent electron pair in the molecule.

Examples of such complexon are as shown below:

(1) Ethylenediaminetetraacetic acid (EDTA),
(2) Dihydroxyethylglycine (DHEG),
(3) Diaminopropanoltetraacetic acid (DPTA-OH),
(4) Ethylenediaminediacetic acid dipropionic acid (EDAPDA),
(5) Diaminopropane tetraacetic acid (Methyl-EDTA),
(6) Hydroxyethylenediaminetriacetic acid (EDTA-OH),
(7) Diethylenetriaminepentaacetic acid (DTPA),
(8) Ethylenediaminediacetic acid (EDDA),
(9) Ethylenediaminedipropionic acid (EDDP),
(10) Glycoletherdiaminetetraacetic acid (GEDTA),
(11) Ethylenediaminediorthhydroxyphenylacetic acid (EDDHA),
(12) Hydroxyethyliminodiacetic acid (HIDA),
(13) Iminodiacetic acid (IDA),
(14) Nitrilotriacetic acid (NTA),
(15) Nitrilotripropionic acid (NTP),
(16) Triethylenetetraminehexaacetic acid (TTHA),
(17) Metaphenylenediaminetetraacetic acid (m-PHDTA),
(18) N-methyliminodiacetic acid,
(19) N-cyclohexyliminodiacetic acid,
(20) N-phenyliminodiacetic acid,
(21) Benzylamine-N,N-diacetic acid,
(22) N-(2-furylmethyl)iminodiacetic acid,
(23) N-(2-tetrahydropyranylmethyl)iminodiacetic acid,
(24) 2-aminomethylpyridine-N,N-diacetic acid,
(25) N-(2-methoxyethyl)iminodiacetic acid,
(26) N-(2-methylthioethyl)iminodiacetic acid,
(27) N-(3-hydroxypropyl)iminodiacetic acid,
(28) N-(2-hydroxycyclohexyl)iminodiacetic acid,
(29) N-(o-hydroxyphenyl)iminodiacetic acid,
(30) o-hydroxybenzylamine-N,N-diacetic acid,
(31) N-2-mercaptoethyliminodiacetic acid,
(32) N-(o-mercaptophenyl)iminodiacetic acid,
(33) N-cyanomethyliminodiacetic acid,
(34) N-(2-aminoethyl)iminodiacetic acid: [ethylenediamine-N,N-diacetic acid],
(35) N-(carbamoylmethyl)iminodiacetic acid,
(36) Aminoacetone-N,N-diacetic acid,
(37) ω-aminoacetophenone-N,N-diacetic acid,
(38) 2-glycylthiophene-N,N-diacetic acid,
(39) N-(o-carboxyphenyl)iminodiacetic acid,
(40) Nitrilodiacetic acid-methylenephosphonic acid,
(41) Nitriloacetic acid-di(methylenephosphonic acid),
(42) Ethylenediamine-N,N'-di-α-propionic acid,
(43) N,N'-di(2-hydroxybenzyl)ethylenediamine-N,N'-diacetic acid,
(44) N,N'-ethylene-bis(2-aminomethylpyridine)-N,N'-diacetic acid,
(45) Ethylenediamine-N,N'-diacetic acid-N,N'-diacetohydroxamic acid,
(46) N-butylethylenediamine-N,N',N'-triacetic acid,
(47) N-cyclohexylethylenediamine-N,N',N'-triacetic acid,
(48) N-octylethylenediamine-N,N',N'-triacetic acid,
(49) N-eicosylethylenediamine-N,N',N'-triacetic acid,
(50) N-benzylethylenediamine-N,N',N'-triacetic acid,
(51) d,l-2,3-diaminobutane-N,N,N',N'-tetraacetic acid,
(52) meso-2,3-diaminobutane-N,N,N',N'-tetraacetic acid,
(53) 1-phenylethylenediamine-N,N,N',N'-tetraacetic acid,
(54) d,l-1,2-diphenylethylenediamine-N,N,N',N'-tetraacetic acid,
(55) 1,3-diaminopropane-N,N,N',N'-tetraacetic acid,
(56) 1,4-diaminobutane-N,N,N',N'-tetraacetic acid,
(57) 1,5-diaminopentane-N,N,N',N'-tetraacetic acid,
(58) 1,6-diaminohexane-N,N,N',N'-tetraacetic acid,
(59) 1,8-diaminooctane-N,N,N',N'-tetraacetic acid,
(60) trans-cyclobutane-1,2-diamine-N,N,N',N'-tetraacetic acid,
(61) trans-cyclopentane-1,2-diamine-N,N,N',N'-tetraacetic acid,
(62) trans-cyclohexane-1,2-diamine-N,N,N',N'-tetraacetic acid (trans type CyDTA),
(63) cis-cyclohexane-1,2-diamine-N,N,N',N'-tetraacetic acid (cis type CyDTA),
(64) Cyclohexane-1,3-diamine-N,N,N',N'-tetraacetic acid,
(65) Cyclohexane-1,4-diamine-N,N,N',N'-tetraacetic acid,
(66) o-phenylenediamine-N,N,N',N'-tetraacetic acid,
(67) cis-1,4-diaminobutene-N,N,N',N'-tetraacetic acid,
(68) trans-1,4-diaminobutene-N,N,N',N'-tetraacetic acid,
(69) α,α'-diamino-o-xylene-N,N,N',N'-tetraacetic acid,
(70) 3,3'-oxy-bis(propyliminodiacetic acid),
(71) 2,2'-oxy-bis(ethyliminodiacetic acid),
(72) 2,2'-thio-bis(ethyliminodiacetic acid),
(73) 2,2'-ethylene-bis-thio(ethyliminodiacetic acid),
(74) N,N'-glycylethylenediamine-N'',N''',N''''-tetraacetic acid,
(75) Ethylenediamine-N,N'-diacetic acid-N,N'-di-α-propionic acid,
(76) Ethylenediamine-N,N,N',N'-tetrapropionic acid,
(77) Ethylenediamine-N,N'-di(acetylglycine)-N,N'-diacetic acid,
(78) Ethylenediamine-N,N'-diacetic acid-N,N'-di(methylenephosphonic acid),
(79) 1,2,3-triaminopropane-N,N,N',N',N'',N''-hexaacetic acid,
(80) Nitrilotri(methylenephosphonic acid),
(81) Ethylenediamine-N,N'-di(methylenephosphonic acid),
(82) Ethylendiamine-N,N'-di(methylene-phosphonic acid),
(83) Ethylenediamine-N,N,N,',N'-tetra(methylenephosphinic acid),
(84) Ethylenediamine-N,N,N',N'-tetra(methylenephosphonic acid),
(85) Cyclohexane-1,2-diamine-N,N,N',N'-tetra(methylenephosphonic acid),
(86) N,N'-bis(2-hydroxybenzyl)ethylenediamine-N,N'-bis(methylenephosphonic acid),
(87) 3-(diphenylphosphine)propionic acid,
(88) 3-(diphenylarsine)propionic acid,
(89) As-phenylarsinediacetic acid,
(90) As-(p-chlorophenyl)arsinedipropionic acid, and
(91) Metaxylylenediamine tetraacetic acid (m-XDTA), and the like, and further metal salts of these compounds.

As such metal salts, there may be mentioned ionic metal salts of alkaline metals which do not have a chelate structure.

Among the above mentioned complexons, compounds (1)–(40), (42)–(79) and (91) are aminocarboxylic acid derivatives. In particular, compounds (2), (12)–(15) and (18)–(40) are those having one nitrogen atom to which an acid group, —(CH$_2$)$_n$COOH, capable of coordination directly attaches, and compounds (1), (3)–(6), (8)–(11), (17), (42)–(78) and (91) are those having two nitrogen atoms to which an acid group capable of coordination directly attaches and having a structure represented by the formula

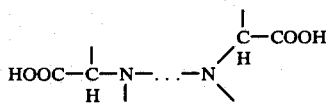

and further compounds (7), (16) and (79) are those having three or more nitrogen atoms to which an acid group capable of coordination directly attaches.

Compounds (4) and (80)–(90) are structural homologues of aminopolycarboxylic acid derivatives.

Except for compounds, 2, 40 and 78, the above-identified aminocarboxylic acid derivatives have structures which may be grouped as follows:

(1) an aminocarboxylic acid compound containing 1 to 3 aminocarboxylic acid groups represented by the following formula(I)

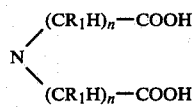   (I)

wherein R$_1$ represents hydrogen, methyl or hydroxyphenyl and n is 1 or 2 (compounds 1, 3–6, 10, 12, 13, 17–39, 51–76, 79 and 91);

(2) an aminocarboxylic acid compound containing 1 to 2 aminocarboxylic acid groups represented by formula(I) above and 1 to 2 aminocarboxylic acid groups represented by the following formula(II):

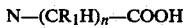   (II)

wherein R$_1$ and n have the same meaning as in formula(I) (compounds 7, 16 and 46–50);

(3) an aminocarboxylic acid compound containing an aminocarboxylic acid group represented by the following formula(III):

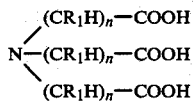   (III)

wherein R$_1$ and n have the same meaning as in formula(I) (compounds 14 and 15);

(4) an aminocarboxylic acid compound containing 2 aminocarboxylic acid groups represented by the following formula(IV):

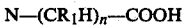   (IV)

wherein R$_1$ and n mean the same as in formula(I) (compounds 8, 9, 11, 42–45 and 77);

(5) nitrogen, phosphorus and arsenic homologues thereof containing 1 to 2 groups represented by the following formula (V):

   (V)

wherein n is 1 or 2, A represents N, P or As and B represents —COOH,

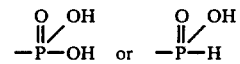

with the proviso that B is not —COOH when A is N (compounds 81, 82 and 86–88);

(6) nitrogen, phosphorus and arsenic homologues thereof containing 1 to 2 groups represented by the following formula(VI):

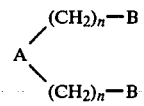   (VI)

wherein n, A and B mean the same as in formula(V) (compounds 41, 83–85, 88 and 90);

(7) nitrogen, phosphorus and arsenic homologues thereof containing 1 group represented by the following formula(VII):

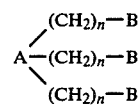   (VII)

wherein n, A and B mean the same as in formula(V) (compound 80).

According to the present invention, Fe$^{2+}$ ion is added. Fe$^{2+}$ ion is known as an auxiliary redox and may be derived from ammonium ferrous sulfate, ferrous sulfate, ferrous chloride and the like. It is necessary to avoid Fe$^{3+}$ ion as far as possible.

In addition to Fe$^{2+}$ ion, a second metal ion is used so as to establish reversibility of redox reaction in the electrochromic medium. As the second metal ion, there may be used ions of elements in Groups IB, IIA, IIB, IIIA, IVB of the Periodic Table, and transition metal elements, in particular, transition metal elements in the fourth period of Groups V, VII and VIII of the Periodic Table.

Representative second metal ions are Ag$^+$, Al$^{3+}$, Ba$^{2+}$, Be$^{2+}$, Ca$^{2+}$, Cd$^{2+}$, Co$^{2+}$, Cu$^{2+}$, Hg$^{2+}$, La$^{3+}$, Mg$^{2+}$, Mn$^{2+}$, Ni$^{2+}$, Pb$^{2+}$, Sn$^{2+}$, Sr$^{2+}$, Ti$^+$, V$^{2+}$ and Zn$^{2+}$.

It is preferable to select the second metal ion in such a way that stability coefficient of the chelate composed of a second metal ion and a complexon is smaller than stability coefficient of the chelate compound composed of the same complexon and Fe$^{2+}$ ion. The selection is preferably made taking into consideration type of the complexon, pH value of the electrochromic medium and ionic strength of ions contained in the medium.

Preferable second metal ions are Al$^{3+}$, Ba$^{2+}$, Ca$^{2+}$, Hg$^{2+}$, Mg$^{2+}$, Mn$^{2+}$, Sr$^{2+}$ and Tl$^+$, and more preferable ones are an alkaline earth metal ion such as Ba$^{2+}$, Ca$^{2+}$, Mg$^{2+}$, Sr$^{2+}$ and the like, and Mn$^{2+}$ and Tl$^+$, which can be effectively used in combination of many complexons.

At least one of these metal ions may be added to the electrochromic medium in a form of chlorides, sulfates, nitrates, perchlorates and the like.

The Fe$^{2+}$ ion and the second metal ions may be those used as an electrolyte in conventional image display devices or may be used in combination with such electrolyte.

Examples of electrolyte used in comventional devices are lithium chloride, potassium chloride, potassium bromide, potassium sulfate, potassium acetate, potassium phosphate, ammonium sulfate, lithium perchlorate and the like.

In the present invention, concentrations of the three essential elements, that is, complexon, $Fe^{2+}$ ion and a second metal ion, in the electrochromic medium may vary depending upon type of the electrochromic material, types of various ions present and their concentrations, but are usually in the following range.

Complexon: $10^{-5}-2$ moles/liter*, preferably $10^{-4}-1$ mole/liter*

$Fe^{2+}$ ion: $10^{-5}-1$ mole/liter*, preferably $10^{-4}-1$ mole/liter*

Second metal ion: $10^{-5}-2$ moles/liter*, preferably $10^{-4}-1$ mole/liter*

(*liter of the electrochromic medium)

When the above mentioned concentrations and the following conditions are employed in combination, good results are obtained.

(a) Concentration of a second metal ion is not lower than that of a complexon or $Fe^{2+}$;

(b) Concentration of a complexon is not lower than that of $Fe^{2+}$ ion; and (c) Sum of concentration of $Fe^{2+}$ ion and that of a second metal is $1-10^3$ times the concentration of a complexon.

According to the present invention, the complexons may be used alone or in combination, and further the complexon may be used in combination with one or more of other chelating agents.

According to the present invention, an auxiliary redox system, a pH buffer solution and other auxiliary agents may be added to the electrochromic medium for the purpose of improving the repeating durability of the image display device.

According to the present invention, when the electrochromic medium containing such ingredients is placed in an appropriate housing, it is desirable to adjust the concentration of oxygen dissolved in the medium to lower than 5 ppm. By decreasing the dissolved oxygen, the time capable of memory can be extended and the life can be lengthened.

According to the present invention, the cycle of redox reaction of the electrochromic medium is reversibly effected in the presence of the three essential components. In other words, by using $Fe^{2+}$ ion, complexon and a second metal ion in combination, the redox reaction of the electrochromic material can proceed reversely, concentration of $Fe^{2+}$ ion can be retained constant for a long period of time, the redox reaction ($Fe^{2+} \rightleftarrows Fe^{3+} + e^-$) can proceed reversely and repeating durability of the image display device can be increased.

According to the present invention, reversibility of the redox reaction can be established regardless of pH value. Therefore, any particular control of pH is not necessary upon preparing an electrochromic medium. For example, when a metal oxide is used as an electrode material, deterioration of the electrode is less than that when a carboxylic acid complexing agent is used. The image display device of the present invention can be repeatedly used $10^6-10^7$ times or more by selecting the conditions appropriately, for example, using a noble metal as the electrode material.

Further, according to the present invention, the essential mechanism of the electrochromic reaction in the electrochromic medium, i.e., a redox reaction, can be effected with a sufficient color density even at a low voltage, and thereby the driving power can be minimized and various undesirable side reactions can be suppressed. An example of the undesirable side reactions is "electrolysis of water" when water is contained in the electrochromic medium. According to the present invention, such side reaction is suppressed, and formation of bubbles and deposition of $Fe(OH)_3$ are also suppressed and therefore, life of the device is hardly shortened.

The device of the present invention is operated, for example, as shown below.

Referring to FIG. 1, a working electrode 1 and a counter electrode 2 are disposed in a cell 3 made of glass, etc., and both electrodes are connected to an external battery 4 by lead lines 5 and 6. An electrochromic medium 7 is sealed in the cell 3. In the first step, working electrode 1 is impressed by a negative voltage and counter electrode 2 is impressed by a positive voltage by applying D.C. voltage from external battery 4 to effect "write-in". In the second step, the circuit from external battery 4 is opened to effect a memory action ("write-in" on working electrode 1 is retained). And in the third step, polarity of voltage to be applied is reversed, i.e., positive voltage to working electrode 1 and negative voltage to counter electrode 2, and such D.C. voltage is applied from external battery 4 to erase the "write-in" on working electrode 1. If desired, write-in may be effected by applying a positive voltage to working electrode 1.

Illustrating some actual layouts of the electrode, FIG. 2A shows the cell 3, in which the working electrodes 1 are placed on a transparent or nontransparent base plate 8, the counter electrodes 2 are placed on the lower surface of a transparent base plate 9 which is opposed to the base plate 8 through a spacer 10, and the thus arranged counter electrodes 2 are concealed by appropriate masking plates 11 placed on the upper surface of the base plate 9. FIG. 2B indicates that both working electrodes 1 and the counter electrodes 2 are disposed on the one and same base plate 8, either transparent or nontransparent. FIG. 2C shows the cell 3, in which the counter electrodes 2 are placed on the transparent or nontransparent base plate 8, the working electrodes 1 are placed on the lower surface of the transparent base plate 9 which is opposed to the base plate 8 through the spacer 10, and the counter electrodes 2 are concealed by a non-transparent film 12 having an ion transmitting property. FIG. 2D shows the cell 3, in which the working electrodes 1 are placed on the transparent or non-transparent base plate 8, and the counter electrodes 2 are fixed on the upright spacer 10.

It should be noted that, besides the abovementioned electrode layouts, various other layouts may be appropriately chosen for the purpose of the present invention.

Figure 3:
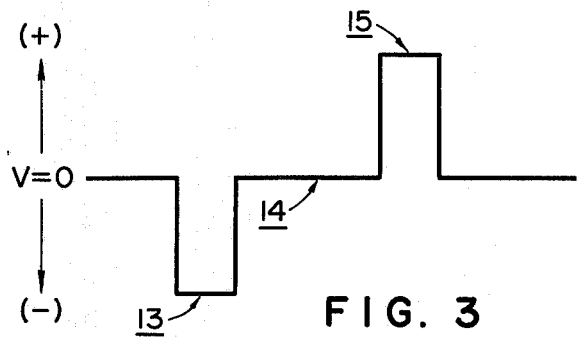
FIG. 3 is a graphical representation for explaining operating stages for the image display device according to the present invention.

Referring to FIG. 3, there is shown a driving wave form of a write-in step 13, a memory step 14 and an erasing step 15 when a driving pulse application scheme is employed.

The abovementioned driving method is one of the simplest bipolar constant voltage scheme. Other than this one, there are known bipolar constant current scheme and tripolar constant voltage scheme. The latter is a driving scheme where a reference electrode is used in addition to working electrode 1 and counter electrode 2 and thereby variation of electric potential at the working electrode is detected and the impressed voltage is automatically controlled so as to keep the electric potential of working electrode 1 constant. The above mentioned driving methods may be applied to the devices of the present invention.

In order to enable skilled persons in the art to appreciate the effect to be resulted from the present invention, and to readily reduce it into practice, the following preferred examples are presented.

EXAMPLES 1 to 62

The cells for the image display device according to the present invention were fabricated in the following manner, and their durability through repetitive use was examined.

(1) Mutually opposed electrodes were arranged within the glass cell;

(2) transparent electrode of tin oxide having a resistance value of 15 ohms/cm$^2$ was used for both working and counter electrodes, each electrode being in a rectangular shape having a size of 2 mm × 3 mm;

(3) an interval or gap of 2 mm was provided between the working and counter electrodes; and (4) solution of various compositions as tabulated in the following was filled in each cell.

The thus obtained various cells were operated by applying a potential cycle of −1.8 V (1 sec.)→0 V (0.5 sec.)→+1.8 V (1 sec.) from a direct current source, as shown in FIG. 3, across the working electrode and the counter electrode disposed in the cell, and the durability of the cell for its repeated cyclic operations of color forming→memory→erasure (color bleaching) was tested. The repetitive durability of the cell was estimated by the number of repeated times until residual image or irregularity in the formed color will occur on the electrodes, when the cyclic operations of the color forming, memory, and color bleaching were continued through the above-described operating method. The test results are recapitulated in the following table.

COMPARATIVE EXAMPLES 1 to 4

For the sake of comparison, the composition for the electrochromic medium in the above-described prescriptions for the examples was altered in various ways, and the repetitive durability of the image display element was tested in the same manner as in the actual examples. The test results are shown in the following table in comparison with those of the examples.

TABLE 1

| | | Composition of electrochromic medium | | | Repetitive durability (number of time) |
|---|---|---|---|---|---|
| | Electrochromic substance (concentration)/Solvent | Metal ion (Fe$^{2+}$) (concentration) | Complexon (concentration) | Metal ion (M)* (concentration) | |
| EXAMPLE 1 | 1,1'-dimethyl-4,4'-bipyridinium dibromide (0.1 mol/l)/water | Ferrous ammonium sulfate ($10^{-4}$ mol/l) | trans type CyDTA ($10^{-3}$ mol/l) | Zinc chloride ($10^{-3}$ mol/l) | 3 × 10$^6$ |
| 2 | 1,1'-dimethyl-4,4'-bipyridinium dibromide (0.1 mol/l)/water | Ferrous sulfate ($10^{-3}$ mol/l) | DHEG ($10^{-2}$ mol/l) | Aluminum sulfate (0.1 mol/l) | 5 × 10$^6$ |
| 3 | 1,1'-dimethyl-4,4'-bipyridinium dibromide (0.1 mol/l)/water | Ferrous sulfate ($10^{-2}$ mol/l) | m-XDTA (0.1 mol/l) | Mercury nitrate (0.3 mol/l) | 6 × 10$^6$ |
| 4 | 1,1'-dimethyl-4,4'-bipyridinium dibromide (0.1 mol/l)/water | Ferrous sulfate (0.1 mol/l) | DHEG (0.3 mol/l) | Lanthanum chloride (0.3 mol/l) | 9 × 10$^5$ |
| 5 | 1,1'-dimethyl-4,4'-bipyridinium dibromide (0.1 mol/l)/water | Ferrous sulfate (0.5 mol/l) | EDDA (0.5 mol/l) | Manganese sulfate (1.0 mol/l) | 2 × 10$^6$ |
| 6 | 1,1'-dibenzyl-4,4'-bipyridinium dibromide (0.1 mol/l)/water | Ferrous chloride ($10^{-4}$ mol/l) | trans type CyDTA ($10^{-3}$ mol/l) | Strontium chloride ($10^{-3}$ mol/l) | 3 × 10$^6$ |
| 7 | 1,1'-dibenzyl-4,4'-bipyridinium dibromide (0.1 mol/l)/water | Ferrous chloride ($10^{-3}$ mol/l) | HIDA ($10^{-2}$ mol/l) | Barium chloride (0.1 mol/l) | 4 × 10$^6$ |
| 8 | 1,1'-dibenzyl-4,4'-bipyridinium dibromide (0.1 mol/l)/water | Ferrous ammonium sulfate ($10^{-2}$ mol/l) | DHEG ($10^{-2}$ mol/l) | Beryllium sulfate ($10^{-2}$ mol/l) | 4 × 10$^6$ |
| 9 | 1,1'-dibenzyl-4,4'-bipyridinium dibromide (0.1 mol/l)/water | Ferrous ammonium sulfate ($10^{-4}$ mol/l) | IDA ($10^{-3}$ mol/l) | Vanadium chloride ($10^{-2}$ mol/l) | 3 × 10$^6$ |
| 10 | 1,1'-diheptyl-4,4'-bipyridinium dibromide (0.1 mol/l)/Methanol | Ferrous ammonium sulfate (5 × $10^{-4}$ mol/l) | EDTA ($10^{-2}$ mol/l) | Magnesium sulfate (0.1 mol/l) | 2 × 10$^6$ |
| 11 | 1,1'-diheptyl-4,4'-bipyridinium dibromide (0.1 mol/l)/water | Ferrous ammonium sulfate ($10^{-3}$ mol/l) | trans type CyDTA (5 × $10^{-3}$ mol/l) | Calcium chloride ($10^{-2}$ mol/l) | 4 × 10$^6$ |
| 12 | 1,1-diheptyl-4,4'-bipyridinium | Ferrous ammonium | DPTA-OH | Manganese sulfate | 7 × 10$^6$ |

TABLE 1-continued

| | Composition of electrochromic medium | | | | Repetitive durability (number of time) |
|---|---|---|---|---|---|
| | Electrochromic substance (concentration)/Solvent | Metal ion ($Fe^{2+}$) (concentration) | Complexon (concentration) | Metal ion (M)* (concentration) | |
| 13 | dibromide (0.1 mol/l)/water 1,1'-diheptyl-4,4'-bipyridinium dibromide | sulfate ($5 \times 10^{-2}$ mol/l) Ferrous sulfate | (0.1 mol/l) EDAPDA | (0.6 mol/l) Tin chloride | $6 \times 10^6$ |
| 14 | (0.1 mol/l)/water 1,1'-diheptyl-4,4'-bipyridinium dibromide | (0.1 mol/l) Ferrous sulfate | (0.5 mol/l) DTPA | (2.0 mol/l) Zinc chloride | $3 \times 10^6$ |
| 15 | (0.1 mol/l)/** 1,1'-diheptyl-4,4'-bipyridinium dibromide | ($10^{-4}$ mol/l) Ferrous sulfate | ($10^{-3}$ mol/l) N-(O-carboxyphenyl) iminodiacetic acid | ($10^{-2}$ mol/l) Silver perchlorate | $4 \times 10^6$ |
| 16 | (0.1 mol/l)/*** 1,1'-diheptyl-4,4'-bipyridinium dibromide | (0.1 mol/l) Ferrous sulfate | (0.3 mol/l) N-2-mercaptoethyliminodiacetic acid | (0.5 mol/l) Cadmium chloride | $4 \times 10^6$ |
| 17 | (0.1 mol/l)/water 1,1'-diheptyl-4,4'-bipyridinium dibromide | (0.1 mol/l) Ferrous ammonium sulfate | (0.1 mol/l) N-(2-aminoethyl)-iminodiacetic acid | (0.3 mol/l) Calcium chloride | $3 \times 10^6$ |
| 18 | (0.1 mol/l)/water 1,1'-diheptyl-4,4'-bipyridinium dibromide | ($10^{-2}$ mol/l) Ferrous ammonium sulfate | ($8 \times 10^{-2}$ mol/l) NTA | (0.1 mol/l) Manganese sulfate | $6 \times 10^6$ |
| 19 | (0.1 mol/l)/water 1,1'-diheptyl-4,4'-bipyridinium dibromide | ($10^{-2}$ mol/l) Ferrous ammonium sulfate | (0.1 mol/l) EDDP | (0.3 mol/l) Magnesium sulfate | $3 \times 10^6$ |
| 20 | (0.1 mol/l)/water 1,1'-dibenzyl-4,4'-bipyridinium dibromide | ($10^{-2}$ mol/l) Ferrous chloride | ($3 \times 10^{-2}$ mol/l) 1,3-diaminopropana-N,N,N',N'-tetraacetic acid | (0.1 mol/l) Beryllium chloride | $4 \times 10^6$ |
| 21 | (0.1 mol/l)/water 1,1'-benzyl-4,4'-bipyridinium dibromide | ($10^{-3}$ mol/l) Ferrous chloride | ($10^{-2}$ mol/l) 1,8-diaminooctane-N,N,N',N'-tetraacetic acid | ($8 \times 10^{-2}$ mol/l) Strontium chloride | $2 \times 10^6$ |
| 22 | (0.1 mol/l)/water 1,1'-dibenzyl-4,4'-bipyridinium dibromide | ($10^{-3}$ mol/l) Ferrous chloride | ($5 \times 10^{-2}$ mol/l) trans type CyDTA | (0.1 mol/l) Magnesium sulfate | $6 \times 10^6$ |
| 23 | (0.1 mol/l)/water 1,1'-dibenzyl-4,4'-bipyridinium dibromide | ($10^{-3}$ mol/l) Ferrous chloride | ($10^{-2}$ mol/l) O-phenylenediamine-N,N,N',N'-tetraacetic acid | (0.5 mol/l) Barium chloride | $3 \times 10^6$ |
| 24 | (0.1 mol/l)/water 1,1'-dimethyl-4,4'-bipyridinium dibromide | ($10^{-3}$ mol/l) Ferrous sulfate | (0.1 mol/l) N,N'-glycylethylene-diamine-N'',N'',N''',N'''-tetraacetic acid | (0.2 mol/l) Calcium chloride | $8 \times 10^5$ |
| 25 | (0.1 mol/l)/water 1,1'-dimethyl-4,4'-bipyridinium dibromide | ($10^{-2}$ mol/l) Ferrous sulfate | (0.1 mol/l) TTHA | (0.5 mol/l) Zinc chloride | $9 \times 10^5$ |
| 26 | (0.1 mol/l)/water 1,1'-dimethyl-4,4'-bipyridinium dibromide | ($10^{-2}$ mol/l) Ferrous Sulfate | ($10^{-2}$ mol/l) Ethylenediamine-N,N'-di(methylenephosphonic acid) | ($5 \times 10^{-2}$ mol/l) Nickel sulfate | $1 \times 10^6$ |
| 27 | (0.1 mol/l)/water 1,1'-diheptyl-4,4'-bipyridinium dibromide | ($10^{-2}$ mol/l) Ferrous sulfate | (0.1 mol/l) DPTA-OH | (0.1 mol/l) Cadmium chloride | $4 \times 10^6$ |
| 28 | (0.1 mol/l)/water 1,1'-diheptyl-4,4'-bipyridinium dibromide | ($10^{-4}$ mol/l) Ferrous sulfate | ($5 \times 10^{-4}$ mol/l) NTP | ($10^{-3}$ mol/l) Lead sulfate | $5 \times 10^6$ |
| 29 | (0.1 mol/l)/*** 1,1'-diheptyl-4,4'-bipyridinium dibromide | (0.1 mol/l) Ferrous sulfate | (0.1 mol/l) N-phenyliminodiacetic acid | (0.5 mol/l) Calcium perchlorate | $3 \times 10^6$ |
| 30 | (0.1 mol/l)/*** 1,1'-diheptyl-4,4'-bipyridinium dibromide | ($10^{-2}$ mol/l) Ferrous ammonium sulfate | ($10^{-2}$ mol/l) DPTA-OH | ($10^{-2}$ mol/l) Beryllium chloride | $5 \times 10^6$ |

TABLE 1-continued

| | Composition of electrochromic medium | | | | Repetitive durability (number of time) |
|---|---|---|---|---|---|
| | Electrochromic substance (concentration)/Solvent | Metal ion ($Fe^{2+}$) (concentration) | Complexon (concentration) | Metal ion (M)* (concentration) | |
| 31 | (0.1 mol/l)/water 1,1'-dibenzyl-4,4'-bipyridinium dibromide | ($10^{-2}$ mol/l) Ferrous chloride | ($10^{-2}$ mol/l) EDTA | ($2 \times 10^{-2}$ mol/l) Lanthanum chloride | $6 \times 10^6$ |
| 32 | (0.1 mol/l)/water 1,1'-dibenzyl-4,4'-bipyridinium dibromide | ($10^{-5}$ mol/l) Ferrous chloride | ($10^{-4}$ mol/l) EDDHA | ($10^{-3}$ mol/l) Thallium perchlorate | $4 \times 10^6$ |
| 33 | (0.1 mol/l)/water 1,1'-dibenzyl-4,4'-bipyridinium dibromide | (0.1 mol/l) Ferrous chloride | (0.1 mol/l) DPTA-OH | (1.0 mol/l) Aluminum sulfate | $2 \times 10^6$ |
| 34 | (0.1 mol/l)/water 1,1'-dimethyl-4,4'-bipyridinium dibromide | ($10^{-3}$ mol/l) Ferrous sulfate | (0.2 mol/l) EDTA | (0.3 mol/l) Cadmium chloride | $3 \times 10^6$ |
| 35 | (0.1 mol/l)/water 1,1'-diheptyl-4,4'-bipyridinium dibromide | ($5 \times 10^{-4}$ mol/l) Ferrous ammonium sulfate | ($5 \times 10^{-4}$ mol/l) N-butylethylenediamine-N,N',N'-triacetic acid | ($10^{-3}$ mol/l) Lanthanum chloride | $4 \times 10^6$ |
| 36 | (0.1 mol/l)/water 1,1'-dimethyl-4,4'-bipyridinium dibromide | ($10^{-4}$ mol/l) Ferrous ammonium sulfate | ($5 \times 10^{-4}$ mol/l) 1,3-diaminopropane-N,N,N',N'-tetraacetic acid | ($5 \times 10^{-4}$ mol/l) Aluminium sulfate | $2 \times 10^6$ |
| 37 | (0.1 mol/l)/water 1,1'-dimethyl-4,4'-bipyridinium dibromide | ($10^{-2}$ mol/l) Ferrous ammonium sulfate | ($2 \times 10^{-2}$ mol/l) GEDTA | ($4 \times 10^{-2}$ mol/l) Silver perchlorate | $3 \times 10^6$ |
| 38 | (0.1 mol/l)/water 1,1'-dibenzyl-4,4'-bipyridinium dibromide | ($10^{-2}$ mol/l) Ferrous ammonium sulfate | ($2 \times 10^{-2}$ mol/l) N-(2-furylmethyl)iminodiacetic acid | ($2 \times 10^2$ mol/l) Lanthanum chloride | $4 \times 10^6$ |
| 39 | (0.1 mol/l)/water 1,1'-diheptyl-4,4'-bipyridinium dibromide | ($10^{-2}$ mol/l) Ferrous sulfate | ($10^{-2}$ mol/l) 2-glycylthiophene-N,N-diacetic acid | ($3 \times 10^{-2}$ mol/l) Zinc sulfate | $3 \times 10^6$ |
| 40 | (0.1 mol/l)/water 1,1'-diheptyl-4,4'-bipyridinium dibromide | ($10^{-2}$ mol/l) Ferrous sulfate | ($2 \times 10^{-2}$ mol/l) 1-phenylethylenediamine-N,N,N',N'-tetraacetic acid | ($4 \times 10^{-2}$ mol/l) Thallium perchlorate | $4 \times 10^6$ |
| 41 | (0.1 mol/l)/water 1,1'-dimethyl-4,4'-bipyridinium dibromide | ($10^{-2}$ mol/l) Ferrous sulfate | ($2 \times 10^{-2}$ mol/l) 1,5-diaminopentane-N,N,N',N'-tetraacetic acid | ($4 \times 10^{-2}$ mol/l) Calcium sulfate | $4 \times 10^6$ |
| 42 | (0.1 mol/l)/** 1,1'-dimethyl-4,4'-bipyridinium dibromide | ($10^{-2}$ mol/l) Ferrous sulfate | ($2 \times 10^{-2}$ mol/l) 3,3'-oxy-bis(propyliminodiacetic acid) | ($3 \times 10^{-2}$ mol/l) Beryllium chloride | $1 \times 10^6$ |
| 43 | (0.1 mol/l)/** 1,1'-diheptyl-4,4'-bipyridinium dibromide | ($10^{-2}$ mol/l) Ferrous sulfate | ($2 \times 10^{-2}$ mol/l) N-(O-hydroxyphenyl)iminodiacetic acid | ($3 \times 10^{-2}$ mol/l) Cadmium sulfate | $4 \times 10^6$ |
| 44 | (0.1 mol/l)/water 1,1'-diheptyl-4,4'-bipyridinium dibromide | ($5 \times 10^{-4}$ mol/l) Ferrous sulfate | ($5 \times 10^{-4}$ mol/l) Aminoacetone-N,N-diacetic acid | ($10^{-3}$ mol/l) Strontium nitrate | $3 \times 10^6$ |
| 45 | (0.1 mol/l)/water 1,1'-diheptyl-4,4'-bipyridinium dibromide | ($5 \times 10^{-4}$ mol/l) Ferrous sulfate | ($5 \times 10^{-4}$ mol/l) Nitriloacetic acid-di(methylenephosphonic acid) | ($10^{-3}$ mol/l) Lead nitrate | $3 \times 10^6$ |
| 46 | (0.1 mol/l)/water 1,1'-dimethyl-4,4'-bipyridinium dibromide | ($10^{-4}$ mol/l) Ferrous sulfate | ($5 \times 10^{-4}$ mol/l) 2-aminomethylpyridine-N,N-diacetic acid | ($5 \times 10^{-4}$ mol/l) Lanthanum nitrate | $9 \times 10^5$ |
| 47 | (0.1 mol/l)/water 1,1'-dimethyl-4,4'-bipyridinium dibromide | ($10^{-4}$ mol/l) Ferrous ammonium sulfate | ($10^{-4}$ mol/l) N-cyclohexyliminodiacetic acid | ($5 \times 10^{-4}$ mol/l) Cadmium chloride | $3 \times 10^6$ |
| 48 | (0.1 mol/l)/water 1,1'-dimethyl-4,4'-bipyridinium dibromide | ($5 \times 10^{-4}$ mol/l) Ferrous ammonium sulfate | ($5 \times 10^{-4}$ mol/l) N-cyanomethyliminodiacetic acid | ($5 \times 10^{-4}$ mol/l) Calcium chloride | $1 \times 10^6$ |
| | (0.1 mol/l)/water | ($5 \times 10^{-4}$ mol/l) | ($10^{-3}$ mol/l) | ($10^{-3}$ mol/l) | |

TABLE 1-continued

| | Composition of electrochromic medium | | | | Repetitive durability (number of time) |
|---|---|---|---|---|---|
| | Electrochromic substance (concentration)/Solvent | Metal ion ($Fe^{2+}$) (concentration) | Complexon (concentration) | Metal ion (M)* (concentration) | |
| 49 | 1,1'-dimethyl-4,4'-bipyridinium dibromide (0.1 mol/l)/water | Ferrous ammonium sulfate ($10^{-4}$ mol/l) | N,N'-ethylene-bis(2-amino-methylpyridine)-N,N'-diacetic acid ($5 \times 10^{-4}$ mol/l) | Aluminium chloride ($5 \times 10^{-4}$ mol/l) | $4 \times 10^6$ |
| 50 | 1,1'-dimethyl-4,4'-bipyridinium dibromide (0.1 mol/l)/water | Ferrous ammonium sulfate ($10^{-4}$ mol/l) | d,l-2,3-diamino-butane-N,N,N',N'-tetraacetic acid ($10^{-3}$ mol/l) | Tin chloride ($5 \times 10^{-3}$ mol/l) | $2 \times 10^6$ |
| 51 | 1,1'-dibenzyl-4,4'-bipyridinium dibromide (0.1 mol/l)/water | Ferrous ammonium sulfate ($10^{-3}$ mol/l) | Cyclohexane-1,2-diamine-N,N,N',N'-tetra-(methylenephosphonic acid) ($2 \times 10^{-3}$ mol/l) | Magnesium perchlorate ($10^{-2}$ mol/l) | $1 \times 10^6$ |
| 52 | 1,1'-dibenzyl-4,4'-bipyridinium dibromide (0.1 mol/l)/water | Ferrous ammonium sulfate ($10^{-3}$ mol/l) | As-phenylarsine-diacetic acid ($10^{-3}$ mol/l) | Cobalt perchlorate ($2 \times 10^{-3}$ mol/l) | $3 \times 10^6$ |
| 53 | 1,1'-dibenzyl-4,4'-bipyridinium dibromide (0.1 mol/l)/water | Ferrous ammonium sulfate ($10^{-3}$ mol/l) | 3-(diphenyl-phosphine)propionic acid ($10^{-2}$ mol/l) | Strontium perchlorate ($10^{-1}$ mol/l) | $1 \times 10^6$ |
| 54 | 1,1'-dibenzyl-4,4'-bipyridinium dibromide (0.1 mol/l)/** | Ferrous ammonium sulfate ($10^{-3}$ mol/l) | Ethylenediamine-N,N'-di(acetylglycine)-N,N'-diacetic acid ($5 \times 10^{-3}$ mol/l) | Calcium perchlorate ($10^{-2}$ mol/l) | $4 \times 10^6$ |
| 55 | 1,1'-dibenzyl-4,4'-bipyridinium dibromide (0.1 mol/l)/** | Ferrous ammonium sulfate ($10^{-3}$ mol/l) | N-eicosylethylenediamine-N,N,N'-triacetic acid ($5 \times 10^{-3}$ mol/l) | Zinc sulfate ($10^{-2}$ mol/l) | $9 \times 10^5$ |
| 56 | 1,1'-diheptyl-4,4'-bipyridinium dibromide (0.1 mol/l)/** | Ferrous ammonium sulfate ($5 \times 10^{-4}$ mol/l) | Ethylenediamine-N,N'-di-α-propionic acid ($5 \times 10^{-4}$ mol/l) | Cobalt sulfate ($5 \times 10^{-4}$ mol/l) | $4 \times 10^6$ |
| 57 | 1,1'-diheptyl-4,4'-bipyridinium dibromide (0.1 mol/l)/** | Ferrous ammonium sulfate ($5 \times 10^{-4}$ mol/l) | N(2-methylthioethyl)iminodiacetic acid ($10^{-3}$ mol/l) | Beryllium sulfate ($2 \times 10^{-3}$ mol/l) | $3 \times 10^6$ |
| 58 | 1,1'-diheptyl-4,4'-bipyridinium dibromide (0.1 mol/l)/** | Ferrous ammonium sulfate ($5 \times 10^{-4}$ mol/l) | m-PHDTA ($10^{-3}$ mol/l) | Tin sulfate ($10^{-3}$ mol/l) | $5 \times 10^6$ |
| 59 | 1,1'-dibenzyl-4,4'-bipyridinium dibromide (0.1 mol/l)/water | Ferrous ammonium sulfate ($5 \times 10^{-4}$ mol/l) | trans-1,4-diamino-butene-N,N,N',N'-tetraacetic acid ($5 \times 10^{-4}$ mol/l) | Manganese nitrate ($5 \times 10^{-4}$ mol/l) | $4 \times 10^6$ |
| 60 | 1,1'-dibenzyl-4,4'-bipyridinium dibromide (0.1 mol/l)/water | Ferrous ammonium sulfate ($2 \times 10^{-4}$ mol/l) | 2,2'-thio-bis(ethyliminodiacetic acid) ($3 \times 10^{-4}$ mol/l) | Copper nitrate ($4 \times 10^{-4}$ mol/l) | $1 \times 10^6$ |
| 61 | 1,1'-dibenzyl-4,4'-bipyridinium dibromide (0.1 mol/l)/water | Ferrous ammonium sulfate ($5 \times 10^{-4}$ mol/l) | 1,2,3-triamino-propane-N,N,N',N',N'',N''-hexaacetic acid ($10^{-3}$ mol/l) | Barium perchlorate ($2 \times 10^{-3}$ mol/l) | $2 \times 10^6$ |
| 62 | 1,1'-dibenzyl-4,4'-bipyridinium dibromide (0.1 mol/l)/water | Ferrous ammonium sulfate ($10^{-4}$ mol/l) | Ethylenediamine-N,N,N',N'-tetra(methylenephosphinic acid) ($2 \times 10^{-4}$ mol/l) | Nickel perchlorate ($2 \times 10^{-4}$ mol/l) | $1 \times 10^6$ |
| Comparative example | | | | | |
| 1 | 1,1'-diheptyl-4,4'-bipyridinium dibromide (0.1 mol/l)/water | Potassium bromide (electrolyte) (0.3 mol/l) | Not added | Not added | $2 \times 10^3$ |
| 2 | 1,1'-diheptyl-4,4'-bipyridinium dibromide (0.1 mol/l)/water | Ferrous ammonium sulfate (0.3 mol/l) | Tartaric acid (complexing agent) (0.1 mol/l) | Not added | $4 \times 10^4$ |
| 3 | 1,1'-dimethyl-4,4'-bipyridinium dibromide | Potassium bromide (electrolyte) | Not added | Not added | $2 \times 10^2$ |

TABLE 1-continued

| | Composition of electrochromic medium | | | | Repetitive durability (number of time) |
|---|---|---|---|---|---|
| | Electrochromic substance (concentration)/Solvent | Metal ion ($Fe^{2+}$) (concentration) | Complexon (concentration) | Metal ion (M)* (concentration) | |
| 4 | (0.1 mol/l)/water 1,1'-dimethyl-4,4'-bipyridinium dibromide (0.1 mol/l)/water | (0.3 mol/l) Ferrous ammonium sulfate (0.3 mol/l) | Tartaric acid (complexing agent) (0.1 mol/l) | Not added | $3 \times 10^3$ |

*Metal ion other than $Fe^{2+}$ ion
**Water (50%)/ethylene glycol (50%)
***Ethylene glycol ($10^{-2}$ mol/l)/water

We claim:

1. An image display device which comprises a cell container, at least a pair of electrodes, and an electrically responsive electrochromic medium accomodated in said cell container, said electrochromic medium comprising a complexon, a redox reactive organic substance, $Fe^{+2}$ ion and at least one metal ion which is (a) other than a $Fe^{+2}$ ion (b) other than an $Fe^{+3}$ ion and (c) other than an alkali metal ion, wherein said complexon is a member selected from the group consisting of:

(1) an aminocarboxylic acid compound containing 1 to 3 aminocarboxylic acid groups represented by the following formula (I)

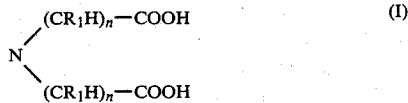
(I)

wherein $R_1$ represents hydrogen, methyl or hydroxyphenyl and n is 1 or 2;

(2) an aminocarboxylic acid compound containing 1 to 2 aminocarboxylic acid groups represented by formula (I) above and 1 to 2 aminocarboxylic acid groups represented by the following formula (II):

(II)

wherein $R_1$ and n have the same meaning as in formula (I);

(3) an aminocarboxylic acid compound containing an aminocarboxylic acid group represented by the following formula (III):

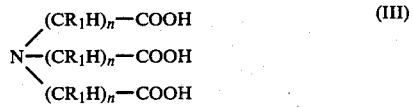
(III)

wherein $R_1$ and n have the same meaning as in formula (I);

(4) an aminocarboxylic acid compound containing 2 aminocarboxylic acid groups represented by the following formula (IV):

(IV)

wherein $R_1$ and n mean the same as in formula (I);

(5) an aminocarboxylic acid compound selected from the group consisting of

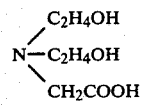

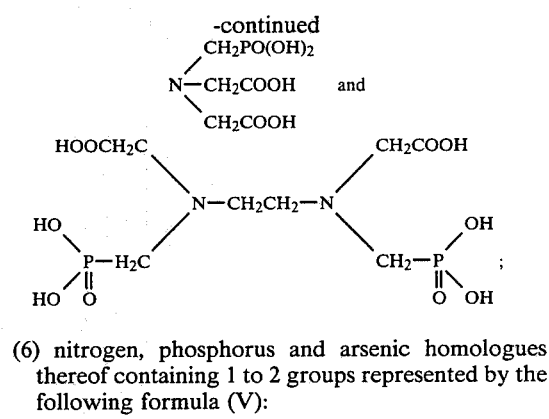

(6) nitrogen, phosphorus and arsenic homologues thereof containing 1 to 2 groups represented by the following formula (V):

(V)

wherein n is 1 or 2, A represents N, P or As and B represents —COOH,

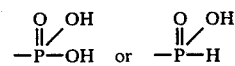

with the proviso that B is not —COOH when A is N;

(7) nitrogen, phosphorus and arsenic homologues thereof containing 1 or 2 groups represented by the following formula (VI):

(VI)

wherein n, A and B mean the same as in formula (V);

(8) nitrogen, phosphorus and arsenic homologues thereof containing 1 group represented by the following formula (VII):

(VII)

wherein n, A and B mean the same as in formula (V); and (9) mixtures thereof.

2. An image display device according to claim 1, in which the concentration of said complexon in said electrochromic medium ranges from $10^{-5}$ to 2 mol/l.

3. An image display device according to claim 1, in which the concentration of said $Fe^{2+}$ ion in said electrochromic medium ranges from $10^{-5}$ to 1 mol/l.

4. An image display device according to claim 1, in which the concentration of said metal ion in said electrochromic medium ranges from $10^{-5}$ to 2 mol/l.

5. An image display device according to claim 1, in which said electrochromic medium includes an inert solvent.

6. An image display device according to claim 5, in which said redox reactive organic substance is a compound having a quaternary ammonium salt structure.

7. An image display device according to claim 1, in which said metal ion is selected from the group consisting of ions of elements of Groups IB, IIA, IIB, IIIA and IVB, and ions of transition metal elements in the fourth period of Groups V, VII and VIII.

8. An image display device according to claim 1, in which the concentration of said complexon is not lower than that of said $Fe^{2+}$ ion.

9. An image display device according to claim 1, in which the concentration of said metal ion is not lower than that of said complexon or $Fe^{2+}$ ion.

10. An image display device according to claim 1, in which the sum of the concentration of said $Fe^{2+}$ ion and that of said metal ion is within a range between 1 to $10^3$ times the concentration of said complexon.

11. An image display device according to claim 1, in which said metal ion is selected from the group consisting of $Ag^+$, $Al^{3+}$, $Ba^{2+}$, $Be^{2+}$, $Ca^{2+}$, $Cd^{2+}$, $Co^{2+}$, $Cu^{2+}$, $Hg^{2+}$, $La^{3+}$, $Mg^{2+}$, $Mn^{2+}$, $Ni^{2+}$, $Pb^{2+}$, $Sn^{2+}$, $Sr^{2+}$, $Tl^+$, $V^{2+}$ and $Zn^{2+}$.

12. An image display device according to claim 1, in which said metal ion is selected from the group consisting of $Al^{3+}$, $Ba^{2+}$, $Ca^{2+}$, $Hg^{2+}$, $Mg^{2+}$, $Mn^{2+}$, $Sr^{2+}$ and $Tl^+$.

13. An image display device as claimed in claim 1, in which said complexon is selected from the group consisting of ethylenediaminetetraacetic acid, dihydroxyethylglycine, diaminopropanoltetraacetic acid, ethylenediaminediacetic acid dipropionic acid, diaminopropane tetraacetic acid, hydroxyethylenediaminediacetic acid, diethylenetriaminepentaacetic acid, ethylenediaminediacetic acid, ethylenediaminedipropionic acid, glycoletherdiaminetetraacetic acid, ethylenediaminediorthhydroxyphenylacetic acid, hydroxyethyliminodiacetic acid, iminodiacetic acid, nitrilotriacetic acid, nitrilotripropionic acid, triethylenetetraminehexaacetic acid, metaphenylenediaminetetraacetic acid, N-methyliminodiacetic acid, N-cyclohexyliminodiacetic acid, N-phenyliminodiacetic acid, benzylamine-N,N-diacetic acid, N-(2-furylmethyl)iminodiacetic acid, N-(2-tetrahydropyranyl-methyl)iminodiacetic acid, 2-aminomethylpyridine-N,N-diacetic acid, N-(2-methoxyethyl)iminodiacetic acid, N-(2-methylthioethyl)iminodiacetic acid, N-(3-hydroxypropyl)iminodiacetic acid, N-(2-hydroxycyclohexyl)iminodiacetic acid, N-(o-hydroxyphenyl)iminodiacetic acid, o-hydroxybenzylamine-N,N-diacetic acid, N-2-mercaptoethyliminodiacetic acid, N-(o-mercaptophenyl)iminodiacetic acid, N-cyanomethyliminodiacetic acid, N-(2-aminoethyl)iminodiacetic acid, N-(carbamoylmethyl)iminodiacetic acid, aminoacetone-N,N-diacetic acid, ω-aminoacetophenone-N,N-diacetic acid, 2-glycylthiophene-N,N-diacetic acid, N-(o-carboxyphenyl)iminodiacetic acid, nitrilodiacetic acid-methylenephosphonic acid, nitriloacetic acid-di(methylenephosphonic acid), ethylenediamine-N,N'-di-α-propionic acid, N,N'-di(2-hydroxybenzyl)ethylenediamine-N,N'-diacetic acid, N,N'-ethylene-bis(2-aminomethylpyridine)-N,N'-diacetic acid, ethylenediamine-N,N'-diacetic acid-N,N'-diacetohydroxamic acid, N-butylethylenediamine-N,N',N'-triacetic acid, N-cyclohexylethylenediamine-N,N',N'-triacetic acid, N-octylethylenediamine-N,N',N'-triacetic acid N-eicosylethylenediamine-N,N,N'-triacetic acid, N-benzylethylenediamine-N,N',N'-triacetic acid, d,l,-2,3-diaminobutane-N,N,N',N'-tetraacetic acid, meso-2,3-diaminobutane-N,N,N',N'-tetraacetic acid, 1-phenylethylenediamine-N,N,N',N'-tetraacetic acid, d, -1,2-diphenylethylenediamine-N,N,N',N'-tetraacetic acid, 1,3-diaminopropane-N,N,N',N'-tetraacetic acid, 1,4-diaminobutane-N,N,N',N'-tetraacetic acid, 1,5-diaminopentane-N,N,N',N'-tetraacetic acid, 1,6-diaminohexane-N,N,N',N'-tetraacetic acid, 1,8-diaminooctane-N,N,N',N'-tetraacetic acid, trans-cyclobutane-1,2-diamine-N,N,N',N'-tetraacetic acid, trans-cyclopentane-1,2-diamine-N,N,N',N'-tetraacetic acid, trans-cyclohexane-1,2-diamine-N,N,N',N'-tetraacetic acid, cis-cyclohexane-1,2-diamine-N,N,N',N'-tetraacetic acid, cyclohexane-1,3-diamine-N,N,N',N'-tetraacetic acid, cyclohexane-1,4-diamine-N,N,N',N'-tetraacetic acid, o-phenylenediamine-N,N,N',N'-tetraacetic acid, cis-1,4-diaminobutene-N,N,N',N'-tetraacetic acid, trans-1,4-diaminobutene-N,N,N',N'-tetraacetic acid, α,α'-diamino-o-xylene-N,N,N',N'-tetraacetic acid, 3,3'-oxybis(propyliminodiacetic acid), 2,2'-oxy-bis(ethyliminodiacetic acid), 2,2'-thio-bis(ethyliminodiacetic acid), 2,2'-ethylene-bis-thio-(ethyliminodiacetic acid), N,N'-glycylethylenediamine-N',N'',N''',N'''-tetraacetic acid, ethylenediamine-N,N'-diacetic acid-N,N'-di-α-propionic acid, ethylenediamine-N,N,N',N'-tetrapropionic acid, ethylenediamine-N,N'-di(acetylglycine)-N,N'-diacetic acid, ethylenediamine-N,N'-diacetic acid-N,N'-di(methylenephosphonic acid), 1,2,3-tri-aminopropane-N,N,N',N'',N''-hexaacetic acid, nitrilotri(methylenephosphonic acid), ethylenediamine-N,N'-di(methylenephosphonic acid), ethylenediamine-N,N'-di(methylenephosphonic acid), ethylenediamine-N,N,N',N'-tetra(methylenephosphinic acid), ethylenediamine-N,N,N',N'-tetra(methylenephosphonic acid), cyclohexane-1,2-diamine-N,N,N',N''-tetra(methylenephosphonic acid), N,N'-bis(2-hydroxybenzyl)ethylenediamine-N,N'-bis(methylenephosphonic acid), 3-(diphenylphosphine)propionic acid, 3-(diphenylarsine)propionic acid, As-phenylarsinediacetic acid, As-(p-chlorophenyl)arsinedipropionic acid, and metaxylenediamine tetraacetic acid.

* * * * *

UNITED STATES PATENT AND TRADEMARK OFFICE
CERTIFICATE OF CORRECTION

PATENT NO. : 4,285,575

DATED : August 25, 1981

INVENTOR(S) : HIROYUKI IMATAKI, ET AL.

It is certified that error appears in the above—identified patent and that said Letters Patent is hereby corrected as shown below:

Col. 3, line 59, change "device" to --devices--;

Col. 3, line 63, change "devices" to --device--;

Col. 4, line 60, change "dispaly" to --display--;

Col. 13, line 19, change "electroce" to --electrode--.

Col. 18, line (#37) Col. entitled "Metal Ion(M)* "$(2 \times 10^2 \text{ mol/l})$" (Concentration) should read --$(2 \times 10^{-2} \text{ mol/l})$--.

Signed and Sealed this

Nineteenth Day of January 1982

[SEAL]

Attest:

*Attesting Officer*

GERALD J. MOSSINGHOFF

*Commissioner of Patents and Trademarks*